Oct. 2, 1962 G. W. FITE, JR 3,056,171
INHIBITOR AND THERMAL INSULATION LINER
FOR PROPELLANT GRAINS
Filed May 17, 1960
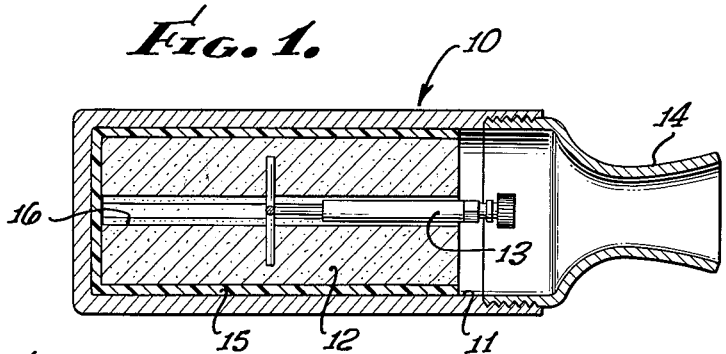
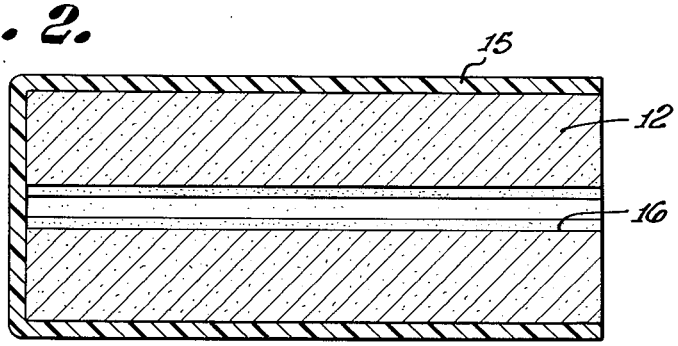
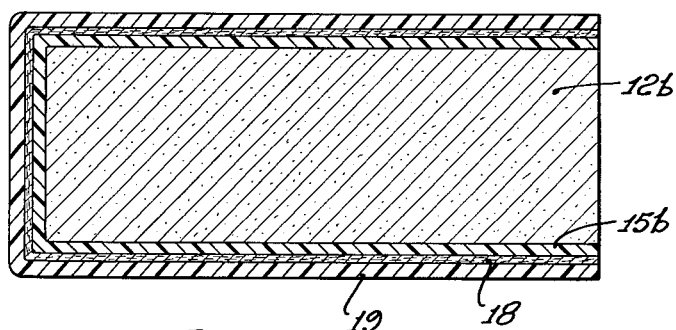
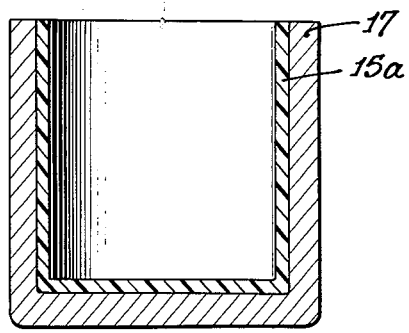
GEORGE WALLACE FITE, JR.
INVENTOR.
BY Miketta and Glenny
ATTORNEYS.

United States Patent Office 3,056,171
Patented Oct. 2, 1962

3,056,171
INHIBITOR AND THERMAL INSULATION LINER FOR PROPELLANT GRAINS
George Wallace Fite, Jr., North Hollywood, Calif., assignor to Mimx Corporation, Glendale, Calif., a corporation of California
Filed May 17, 1960, Ser. No. 29,637
4 Claims. (Cl. 18—59)

The present invention relates to a shrinkable plastic liner device for use as a thermal insulation liner, an inhibitor for a solid propellant rocket grain, or as both an inhibitor and thermal insulation liner, and the method of producing such a plastic liner.

A rocket derives its thrust from ejection of hot gases generated from material known as propellants within the combustion chamber of the rocket. Two basic types of rocket propellants are liquid and solid propellants. Generally, liquid propellant rockets are designed to travel greater distances and burn for longer periods than solid propellant rockets. Therefore, it is required to cool the walls of the combustion chamber of a liquid propellant rocket by various means such as liquids or heat exchangers. However, solid propellant rockets are generally of short duration and the combustion chamber walls are uncooled.

The problem of heat transfer failures in the walls of an uncooled solid propellant rocket is as important as those in a cooled liquid propellant rocket. The wall temperature on the combustion side of the chamber may exceed the value at which the material is readily melted or oxidized. The local loss of material and the local heating sets up stresses in and weakens the wall so that the remaining material is inadequate to take the imposed load or pressure within the chamber. This failure is characterized by melting, erosion, or severe oxidation on the combustion side of the chamber wall. This type of failure occurs primarily in uncooled chamber walls, but may also occur in cooled chambers.

The specific material and its thickness for the chamber wall are therefore important considerations in the design of a rocket engine. As in all flying articles, weight is at a premium and only sufficient metal is provided for the wall of a combustion chamber to absorb the rejected heat without risking a failure from a weakening of the material with increasing wall temperature. Therefore, the wall must be capable of withstanding the applied load and have a minimum of weight. Unfortunately, all metals lose strength as their temperatures are increased, thus requiring greater wall thickness for higher temperatures.

To overcome this problem, insulation liners have been used in uncooled rocket engines to prevent the wall of the combustion chamber from being exposed to tremendously high temperatures produced by combustion of the propellant grain. The present invention may be used as such an insulation liner and is capable of withstanding temperatures well over 3000° F. while maintaining its form stability or solid condition.

In addition, the liner device of the present invention may be used as an inhibitor to limit or restrict the exposed burning surfaces of a solid propellant grain in a rocket. A propellant grain provided with an inhibitor is known as a restricted grain as compared to an unrestricted grain without an inhibitor. The burning rate of a restricted grain is more uniform and for a longer period than of an unrestricted propellant grain. Heretofore, inhibitors were provided by dipping the grain into a suitable liquid, bonding sheets of material to the grain, or wrapping tape around the propellant grain. In general, these inhibitors burned with the propellant grain, and did not remain in a solid condition after the grain was combusted. The liner device of the present invention may be used as an inhibitor, but remains in a solid condition after the propellant grain has burned at temperatures in excess of 3000° F.

It is therefore understood that the liner device of the present invention may be used as a thermal insulation liner or as an inhibitor. Moreover, where it is desired to provide both a thermal insulation liner and an inhibitor, the present liner device is particularly well suited, as it remains in its solid condition or form stability during and after the combustion of the propellant grain. It is understood that whether the present liner device as described herein is used as an inhibtor and/or thermal liner, the period of exposure time at elevated temperatures may be and generally is of very short duration, such as seconds or micro-seconds. It should be further understood that the present invention is being described in connection with propellant grains and rockets, but may be equally as well used for thermal insulation liners on other devices such as flares, gas generators, jet-type combustion chambers or an other types of combustible charges.

In its broadest aspect, the present invention includes a shrinkable plastic thermal insulation liner capable of withstanding tremendously high temperatures in excess of 3000° F. while retaining its form stability or its solid condition. While it is believed that other plastic compositions may be used for this liner device, polyethylene has been used as the material from which the liner device has been made and tested. As will be disclosed in detail hereinafter, a polyethylene composition is particularly suited for use as the material in the device of the present invention, but the invention is not to be restricted thereto.

An object of the present invention is to provide a shrinkable plastic liner for use as a thermal insulation liner.

Another object is to provide a thermal insulation liner capable of withstanding temperatures in excess of 3000° F. while retaining its solid condition or form stability.

A further object is to provide an inhibitor for controlling the rate of burning of a propellant grain by limiting the exposed burning surface of the grain.

Another object is to provide a shrinkable plastic liner device capable of being as an inhibitor and thermal insulation liner.

Still another object is to provide a shrinkable plastic liner having crosslinked molecules and which is under stress thereby exhibiting temperature-resisting characteristics with temperatures above 3000° F.

Still another object is to provide a method of producing a shrinkable plastic liner device capable of performing the objects set forth hereinabove.

Another object is to provide a plastic liner useable as a thermal insulation liner which may also function as an electrical tuner or radiation shield.

Other objects and many of the attendant advantages of this invention will be readily appreciated as the same become better understood by reference to the following detailed description when considered in connection with the accompanying drawings wherein:

FIG. 1 is a longitudinal section of an exemplary device in which the liner device of the present invention may be used;

FIG. 2 is a longitudinal section of a solid propellant grain on which is an inhibitor and insulation liner device of the present invention;

FIG. 3 is a longitudinal section of an exemplary cylindrical article having a thermal insulation liner of the present invention thereon; and FIG. 4 is a longitudinal section of another embodiment of the present invention.

Referring now to the drawings wherein like reference characters designate like or corresponding parts throughout the several views, there is shown in FIG. 1 a diagrammatic representation of an exemplary solid propellant rocket 10 including a combustion chamber 11, a solid propellant grain 12 within the chamber 11, a pyrotechnic igniter 13 for igniting the propellant grain, an exhaust nozzle 14, and a liner 15 for use as an inhibitor and/or thermal insulation liner. As best shown in FIG. 1, the inhibitor 15 may enclose all of the outer surfaces of the propellant grain 12 except the end facing the exhaust nozzle 14. The uncovered surface of the rear end of the propellant grain is therefore exposed and combusted when the grain is ignited. Under these conditions, the grain will burn uniformly from one end to the other end and from inside to outside due to the central port or cavity 16 within the grain.

As may be easily understood, the inhibitor 15 may also be used as a thermal insulation liner to prevent excessively high temperatures produced by the propellant grain during combustion from overheating the wall of the combustion chamber 11. The present invention allows the inhibitor to insulate the chamber wall as it retains its solid condition during and after the combustion of the propellant grain 12 at temperatures in excess of 3000° F. Therefore, an inhibitor and insulation means is provided for restricting the burning surface of the propellant grain and for insulating the chamber wall along a zone between said propellant grain and chamber wall.

In general, the method of producing such a thermal insulation liner and inhibitor 15 is to form a thin liner of shrinkable plastic material into an original shape having smaller predetermined dimensional characteristics than those exhibited by the propellant grain 12 on which the inhibitor is to be assembled, and to assemble the plastic inhibitor in intimate and substantially homogeneous contact on selected areas of the propellant grain so that the plastic material is under a stressed condition and has greater dimensions than those originally exhibited by the plastic inhibitor. As stated above, polyethylene which is a thermoplastic resin made by polymerization of ethylene, has been found to be especially suited for such an inhibitor and insulation liner and for ease of description and clarity will be used in describing the specific steps for producing the liner device of the present invention. However, other shrinkable plastics are believed to be useable, such as tetrafluoroethylene resins identified by the trademark Teflon; neoprene and other synthetic rubbers, silicon molding materials, polyolefin compounds, etc.

For ease of assembly and quality, the polyethylene liner is assembled on the propellant grain 12 or articles on which the liner is to be assembled in a specific manner after the polyethylene composition has been formed into an original shape having predetermined dimensions less than the dimensions of the propellant grain. The specific steps of such assembly will now be described.

After formation into an original shape, the liner is then subjected to radiation from a high velocity electron-producing source of which there are many and which forms no part of the present invention. An interesting property of lightly irradiated polyethylene can be referred to as the memory effect. If the polymer is crosslinked very lightly (about 5 crosslinks per atom) and then reheated above the usual crystalline melting point of 285° F., it is flexible and can be deformed. If the modified shape is cooled, crystallization occurs and the molecules become locked in their new position. However, on reheating the modified shape of polyethylene above the crystalline melting temperature of 285° F. the crystallites melt and the few crosslinks present return the polyethylene to its original shape. This memory effect is introduced during irradiation when primary bonds are formed between adjacent carbon atoms of the polyethylene molecules. After a radiation dose of about $1 \times 10^6$ to $1 \times 10^{10}$ REP (amount depends on molecular weight), the polyethylene no longer melts because it is transformed into a three-dimensional network. Therefore, after the liner is irradiated, a dimensional memory effect is introduced to the molecules of polyethylene conforming to the original predetermined dimensions of the liner.

The irradiated polyethylene liner is then heated above its crystalline melting temperature (285° F.) so that it is flexible.

In its flexible, heated condition, the liner is deformed into a modified shape having dimensions greater than those exhibited by the original shaped liner and greater than the dimensions of the propellant grain or article on which the liner is to be assembled.

The deformed or modified liner of polyethylene may be cooled below its crystalline melting temperature to lock the molecules into the modified condition. In this frozen condition, the liner may be stored for any period of time without adverse effects. For production purposes, it would be desirable to have many of these frozen liners in distorted or modified form available.

The deformed, frozen liner is then assembled around a propellant grain 12 which has dimensions ranging between those exhibited by the original shape of the liner and those exhibited by the deformed shape of the liner.

In this assembled position, the polyethylene liner is then reheated above its crystalline melting temperature to cause the liner to shrink and contract, and to tend to return to its original shape and dimensions in accordance with its memory effect. However, since the propellant grain has dimensions greater than the dimensions of the original shape of the liner, the liner cannot fully return to its original shape and dimensions. The liner 15 has therefore contracted and is in tight engagement and intimate contact with the outer surface of the propellant grain 12. The liner is therefore substantially homogeneously assembled on the grain in a stressed condition. The stress pattern formed by compression and tension forces in the irradiated, crosslinked polyethylene molecules is believed to cause the polyethylene liner to exhibit unusual heat resistant characteristics withstanding temperatures well in excess of 3000° F. while retaining its solid condition or form stability during and after exposure.

The inner surface of the liner is degraded during combustion of the propellant. However, due to the relatively short burning period of the propellant, the liner withstands being consumed and therefore retains its form stability or solid condition.

A suitable bonding agent compatible to the propellant grain and liner may be sprayed on the outer surfaces of the propellant grain prior to the liner 15 being reheated for contraction and intimate contact with the grain 12. An epoxy resin has been found to be suitable to aid in bonding the liner to the grain. Solid propellants may consist of many different materials dependent upon the design of the particular rocket engine. Tests have been conducted with solid propellants that are combusted at temperatures generally of the order of 4900° F. and above. Suitable propellants may include potassium perchlorate as an oxidizer and a mixture of asphalt and oils as fuel, although there are many others capable of burning at higher temperatures.

A restricted propellant grain is therefore provided in an efficient and economical manner with an inhibitor for restricting the burning surface of the grain and with an insulation means for insulating the chamber wall along a zone between the propellant grain and chamber wall.

The present invention also contemplates producing only a thermal insulation liner 15a capable of withstanding high temperatures in excess of 3000° F. Such insulation liners may be on the inside of a cylinder 17, (FIG. 3), for example, rather than on the outside of an article.

In such a situation, the same method as described above may be used in producing the insulation liner, except that the original shape of the liner will have predetermined dimensional characteristics greater than the dimensions of the cylinder or article on which the liner will be assembled. After the plastic liner has been irradiated and heated, it is deformed into a modified shape having dimensions less than the dimensions of the cylinder or article, and is locked in this condition. After assembling the deformed plastic liner within the cylinder or article, heat is applied to the liner causing it to expand and intimately engage the inner walls of the cylinder or article in a stressed condition in substantially the same manner as described above. Stress patterns are also created here in the plastic liner whereby temperatures in excess of 3000° F. are withstood.

It should be understood that there are pressure-temperature-time relationships involved in the present invention that may alter the results described herein. However, due to the extreme difficulty or impossibility of conducting environmental or simulated tests of rocket combustion chambers in space or vacuum, the specific pressure and temperature relationships are not known. Therefore, the stresses in the material when projected into space may vary and change and are therfore indeterminate.

The present invention also contemplates the provision of electrically conductive and magnetic particles in the plastic composition so as to function as an electrical tuner. At very high frequencies, resonant circuits may be controlled or tuned by having metallic particles, such as ferro-magnetic particles, of high or low permeability, adjacent thereto. Such metallic particles at a predetermined number and size may be used in the plastic liner of the present invention to tune such resonant circuits which are enclosed within or adjacent to the plastic liner.

Other particles, such as boron, may also be added to the plastic liner of the present invention to function as a radiation shield for space vehicles. Such a liner device would function as a restrictor or inhibitor and thermal barrier for the wall of the combustion chamber as well as prevent radiation from damaging sensitive equipment in the rocket.

Another embodiment of the present invention is exemplified in FIG. 4 and is a modification of the liner device 15 described above and shown in FIGS. 1 and 2. Dependant upon the material and shape of the propellant grain, different pressures may be produced during combustion. In a solid end rocket propellant grain 12b, the pressures at a given portion of the liner may be greater during combustion than in a grain 12 as seen in FIGS. 1 and 2 having a hollow core 16. Therefore, it may be desirable to provide means around the plastic inhibitor or restrictor liner to prevent the liner from expanding due to tremendous increases in pressure during combustion of the grain 12b.

As seen in FIG. 4, a solid end propellant grain 12b may be provided with a thin liner of plastic material 15b for use as a restrictor and thermal insulation liner. For brevity, this liner 15b is identical in function and structure to the liner 15 in FIGS. 1 and 2 and is applied to the grain 12b in exactly the same manner. Therefore, reference should be made to the above description of the liner 15 for understanding the function, structure and method of applying liner 15b.

A fibrous retainer layer 18 surrounds and is in intimate contact with the liner 15b. While various materials may be used for the retainer layer 18, impregnated fiber glass is believed to be suitable. The resins for impregnating the fibers are preferably thermosetting materials such as phenolics or epoxys. The tensile strength of the fibers used will vary with the pressures that may be created by combustion of the grain.

A second liner 19 of thin, shrinkable, plastic composition may be intimately bonded to the retainer layer 18 under a stressed condition in the same manner as described above for applying liner 15 on the grain 12. This embodiment therefore provides inner and outer plastic liners which are separated by an impregnated fibrous material for functioning as a restrictor or inhibitor and thermal insulation liner. Such a liner may be used to resist greater pressures and to withstand elevated temperatures for a longer time while still retaining its form stability or solid condition.

It is understood that in the embodiment of FIG. 4 various plastics may be used such as polyethylene. However, another plastic such as polyolefin compounds is also believed to be particularly well suited.

It is therefore seen that the present invention provides a thermal insulation liner capable of withstanding excessively high temperatures. While the liner may also be used as an inhibitor for a restricted solid propellant grain, it is obvious that there are many other uses for such a liner within the scope of the present claims. The method for making such a liner is relatively inexpensive and may be easily adapted for production purposes.

Obviously many modifications and variations of the present invention are possible in the light of the above teachings. It is therefore to be understood that within the scope of the appended claims the invention may be practiced otherwise than as specifically described.

I claim:

1. The method of producing an inhibitor and thermal insulation liner for restricting the burning surface of a solid propellant grain within a solid propellant rocket combustion chamber and for withstanding temperatures in excess of 3000° F. while retaining its solid condition, comprising the steps of: forming an inhibitor and thermal insulation liner of shrinkable plastic composition into an original shape having predetermined dimensions; irradiating the plastic liner to introduce a dimensional memory effect to the molecules of plastic conforming to the original predetermined dimensions; heating the plastic liner above its crystalline melting temperature so that it is flexible; deforming the plastic liner in its flexible condition into a modified shape having greater dimensions than those exihibited by the original shaped liner; cooling the deformed plastic liner below its crystalline melting temperature to lock the molecules into the modified condition; assembling said deformed plastic liner around the propellant grain which has dimensions ranging between those exhibited by the original shape of the liner and those exhibited by the deformed shape of the liner; and reheating the plastic liner above its crystalline melting temperature to cause the liner to contract and to tend to return to its original shape and dimensions and thereby tightly engage the outer surface of said propellant, the liner is in intimate contact with and substantially homogeneously assembled on the propellant grain in a stressed condition without having fully returned to its original shape and dimensions, whereby in the assembled, stressed condition, the liner is capable of being exposed to temperatures in excess of 3000° F. while retaining its solid condition.

2. The method of producing an inhibitor and thermal insulation liner for restricting the burning surface of a solid propellant grain within a solid propellant rocket combusion chamber and for withstanding temperatures in excess of 3000° F. while retaining its solid condition, comprising the steps of: forming an inhibitor and thermal insulation liner of shrinkable plastic composition into an original shape having predetermined dimensions less than the dimensions of a propellant grain on which the liner is to be assembled; irradiating the liner to introduce a dimensional memory effect to the molecules of plastic conforming to the original predetermined dimensions; deforming the liner into a modified shape having greater dimensions than those exhibited by the propelant grain; assembling the liner around the propellant grain which has dimensions ranging between those exhibited by the original shape of the liner and those exhibited by the deformed shape of the liner; and contracting the liner to tightly assemble it on the outer surface of the propellant grain and to tend to return the liner to its original shape and dimensions, the liner being in intimate contact with and substantially homegeneously assembled on the propellant grain in a stressed condition without having fully returned to its original shape and dimensions, whereby in the assembled, stressed condition the liner is capable of being exposed to temperatures in excess of 3000° F. produced by combustion of the propellant grain while retaining its solid condition.

3. The method of producing a thermal insulation liner capable of withstanding temperatures in excess of 3000° F. while retaining its solid conditions, comprising the steps of: forming a liner of shrinkable plastic composition into an original shape having predetermined dimensional characteristics; irradiating the plastic liner to introduce a dimensional memory effect to the molecules of the liner conforming to the original predetermined dimensional characteristics; heating the plastic liner above its crystalline melting temperature so that it is flexible; deforming the plastic liner in its flexible condition into a modified shape having different dimensional characteristics than exhibited by the original shaped liner; cooling the deformed plastic liner below its crystalline melting temperature to lock the molecules into the modified condition; positioning the modified liner adjacent the article on which will be assembled, the article having dimensional characteristics ranging between those exhibited by the original shape of the liner and those exhibited by the deformed shape of the liner; and reheating the modified plastic liner above its crystalline melting temperature to assemble it on the article and to cause the liner to tend to return to its original shape and dimensional characteristics; the liner being in intimate contact with and substantially homogeneously assembled on the article in a stressed condition without having fully returned to its original shape and dimensional characteristics due to the different dimensional characteristics of the article, whereby in the assembled, stressed condition, the liner is capable of being exposed to temperatures in excess of 3000° F. while retaining its solid condition.

4. The method of producing a thermal insulation liner as stated in claim 3, wherein the plastic composition is polyethylene and the polyethylene molecules are cross-linked when the liner is irradiated.

References Cited in the file of this patent
UNITED STATES PATENTS

| | | |
|---|---|---|
| 2,479,828 | Geckler | Aug. 23, 1949 |
| 2,686,936 | Tuckerman | Aug. 24, 1954 |
| 2,703,963 | Tuckerman | Mar. 8, 1955 |
| 2,835,107 | Ward | May 20, 1958 |

FOREIGN PATENTS

| | | |
|---|---|---|
| 26,430 | Great Britain | of 1907 |
| 818,963 | Great Britain | Aug. 26, 1959 |